March 7, 1950  F. E. ALTMAN  2,500,017
APOCHROMATIC TELESCOPE OBJECTIVES AND
SYSTEMS INCLUDING SAME
Filed July 7, 1948
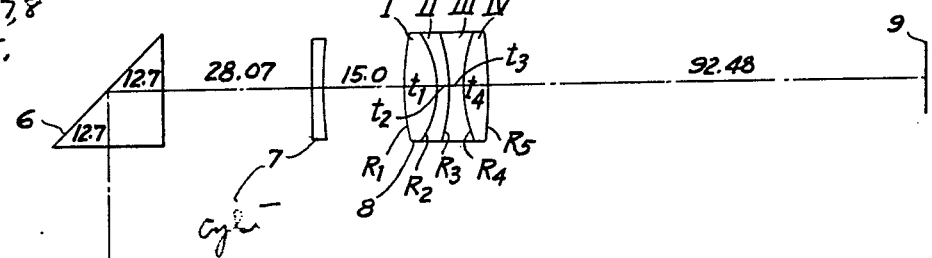
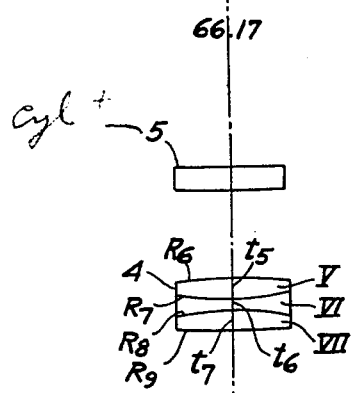
FIG. 2.
| OBJECTIVE 8 | | | EF = 100 mm. | | f/5.0 |
|---|---|---|---|---|---|
| LENS | N | V | P | RADII | THICKNESSES |
| I | 1.5286 | 51.6 | 0.580 | $R_1$ = +64.09 mm. | $t_1$ = 7.0 mm. |
| II | 1.5230 | 58.6 | 0.567 | $R_2$ = −17.52 | $t_2$ = 2.0 |
| III | 1.6129 | 44.0 | 0.583 | $R_3$ = −30.59 | $t_3$ = 2.0 |
| IV | 1.6203 | 60.3 | 0.566 | $R_4$ = +24.43 | $t_4$ = 5.7 |
| | | | | $R_5$ = −144.67 | |
FIG. 3.
| OBJECTIVE 4 | | | EF = 250 mm. | | f/12.5 |
|---|---|---|---|---|---|
| LENS | N | V | P | RADII | THICKNESSES |
| V | 1.5254 | 54.8 | 0.576 | $R_6$ = +160.13 mm. | $t_5$ = 3.0 mm. |
| VI | 1.6129 | 44.0 | 0.583 | $R_7$ = −94.45 | $t_6$ = 2.0 |
| VII | 1.6170 | 55.0 | 0.578 | $R_8$ = +62.81 | $t_7$ = 3.0 |
| | | | | $R_9$ = −388.0 | |
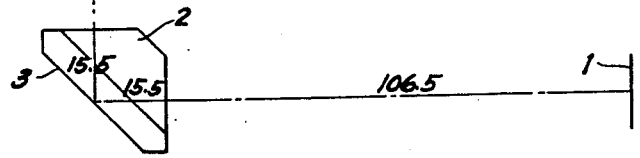
FRED E. ALTMAN
INVENTOR
BY
ATTORNEY & AGENT Patented Mar. 7, 1950

2,500,017

UNITED STATES PATENT OFFICE 2,500,017

APOCHROMATIC TELESCOPE OBJECTIVES AND SYSTEMS INCLUDING SAME

Fred E. Altman, Rochester, N. Y., assignor to Eastman Kodak Company, Rochester, N. Y., a corporation of New Jersey Application July 7, 1948, Serial No. 37,478

5 Claims. (Cl. 88—57)

This invention relates to lens systems and particularly to telescope objective lenses and the like, which are highly corrected over a narrow field of view of the order of 1°.

An object of the invention is to provide a telescope objective which is fully corrected for coma, marginal and zonal spherical aberration, and spherochromatism and which is substantilly corrected for secondry color throughout the visible spectrum or an equivalent range of wave lengths, that is to say about an octave of wave lengths.

A particular object of the invention is to provide a lens system for copying the sound track of colored motion picture film, and which is capable of producing a sharply focused image in all the colors to which the film is sensitive.

The requirements for the correction of secondary color in optical systems are well known and involve the use of special types of glass having unusual partial dispersion ratios such that the glasses used in the positive and negative components are similar with respect to these partials. The partial dispersion ratio for a specified region of the spectrum is defined as the ratio of the partial dispersion for that region to the mean dispersion between the C and F lines. For example, the ratios $$\frac{N_{G'}-N_F}{N_F-N_C}, \frac{N_F-N_e}{N_F-N_C}, \text{ and } \frac{N_C-N_{A'}}{N_F-N_C}$$

where N with a subscript denotes the refractive index for the spectral line designated by the subscript, are the partial dispersions for the F to G' region, the e to F region and the A' to C region respectively. These particular ratios are usually taken as standard and listed in glass catalogs. In correcting optical systems for the whole visible spectrum, the G' to F partial is the most troublesome, and so this ratio is used in the computations. For convenience this ratio may be denoted by P, that is $$P = \frac{N_{G'}-N_F}{N_F-N_C}$$

It is known that for all ordinary glasses, P varies almost linearly with the inverse dispersive index or V-value and is within about 0.004 of the value expressed by the equation $P = 0.676 - 0.00185V$. Thus P normally runs larger for flint glasses than for crown glasses.

Some borate glasses (including the short flints) are known in which the value of P is smaller than in ordinary glasses and these are favorable for use in negative elements. Also, some fluoride glasses are described in patent applications Serial Number 568,314 filed December 15, 1944, by Sun and Huggins, Serial Number 644,178, filed January 29, 1946, by Sun and Huggins, now Patent Number 2,481,700, dated September 13, 1949, and Serial Number 644,179, filed January 29, 1946, by Sun. These fluoride glasses have P-values considerably larger than the normal as given by the above equation for ordinary glasses, and thus are favorable for use in the positive elements.

Theoretically, if P is the same for all the elements in the system, the light of the three wave lengths G', F, and C is brought to a common focus, and all the other colors focus very near to this point. Usually it is not possible to find suitable glasses which exactly meet this condition, but there are a few combinations available that are favorable for the correction of secondary color if more than two glass types are used in the lens system. These combinations have partial dispersions such that the weighted average of the P-values of the glasses used in the negative element is substantially equal to the like average for the positive elements, these averages being weighted according to the powers of the lens elements.

According to the present invention, an objective is made up of four elements cemented together and providing three cemented surfaces. The curvatures and powers of the three cemented surfaces are selected to simultaneously correct the zonal spherical aberration, and the spherochromatism. The outer surfaces of the objective are assigned curvatures which control the coma for the particular conjugate distances at which the lens is to be used, usually infinity. The central one of the three cemented surfaces corresponds closely in function to the usual cemented surface in a telescopic doublet and corrects the marginal spherical aberration. The front cemented surface is collective and concave toward the front, and is more strongly curved than the second cemented surface. Due to the high angle of incidence with which the marginal rays strike this first cemented surface it has a strong effect in correcting for zonal spherical aberration. I have discovered that if the V-value of the front element is less than that of the second element this surface has a stronger effect on the aberration for the shorter wavelength, and thus serves to correct the spherochromatism. I have found that when the V-value of the front element is between 85% and 95% of that of the second element, and the refractive indices of the two elements differ by between 0.0025, and 0.01, the best correction of zonal aberration and spherochromatism is obtained.

The glasses used in the third and forth elements are selected so that the partial dispersion ratio P of the third element is less than that of normal glasses, and that of the fourth element is at least as large as normal. In other words, a short flint glass is used in the third element. All known stable short flint glasses have V-values greater than 41 and thus are not suitable for correcting the axial color unless hyperchromatized in known manner. This hyperchromatizing is done by cementing together a strong negative element of the short flint glass and a positive element of a crown glass with refractive index about the same as that of the short flint glass, preferably differing therefrom by less than 0.05, and with a V-value greater than that of the short flint glass by at least 10. These two elements make up the third and fourth elements of the objective. The cemented surface between them, that is the third cemented surface of the objective, is convex to the front and has very little refractive power due to the very small difference in refractive index, and so may easily be varied through a considerable range of curvatures during the design of the lens to adjust the correction of longitudinal color without having any noticeable effect on the other aberrations.

In the accompanying drawing:

Fig. 1 shows a lens system according to the invention.

Fig. 2 gives data for an objective according to the invention.

Fig. 3 gives data for an objective preferred for use therewith in the optical system.

In Fig. 1 the sound track of a 35 mm. motion picture film I is copied onto a 16 mm. film 9 at a reduction in size of 2½ to 1 along the length of the film. A different reduction, about 1.27 to 1, is required in the width of the sound track. An apochromatic telescope or collimator objective 8, constructed as described in detail below and having a focal length of 100 mm. is optically aligned face to face with a cemented triplet 4 having a focal length of 250 mm. and with collimated light between them. The ratio of focal lengths is chosen to give the correct reduction ratio along the length of the film. A positive cylindrical lens 5 and a stronger negative cylindrical lens 7 are arranged between the two objectives and spaced afocally so as to change the magnification in the direction of the width of the film without disturbing the sharpness of the image in the direction along the film. A light source and a condenser lens system (not shown) are provided in which one of the surfaces is preferably cylindrical or toric so as to match the image of the light source with the different pupil distances in the two azimuths in known manner. The prisms 2 and 6 reflect the beam of light so that the film gates which are optically conjugate to each other are in a convenient relative position whereby the sprocket wheels (not shown) run on a common axis and have diameters in the ratio of 2½ to 1 to give the correct relative film movement. The image is also inverted by the roof edge 3 of the prism 2 so that it moves in the right direction when the film advances.

Fig. 2 gives data for one form of the objective 8 of Fig. 1. This data is as follows:

| Lens | N | V | P | Radii | Thicknesses |
|---|---|---|---|---|---|
| I | 1.5286 | 51.6 | .580 | $R_1 = +64.09$ mm. | $t_1 = 7.0$ mm. |
| II | 1.5230 | 58.6 | .567 | $R_2 = -17.52$ | $t_2 = 2.0$ |
| III | 1.6129 | 44.0 | .583 | $R_3 = -30.59$ | $t_3 = 2.0$ |
| IV | 1.6203 | 60.3 | .566 | $R_4 = +24.43$ | $t_4 = 5.7$ |
|  |  |  |  | $R_5 = -144.67$ |  |

A second example has constructional data as follows:

| Lens | N | V | P | Radii | Thicknesses |
|---|---|---|---|---|---|
| I | 1.5286 | 51.6 | .580 | $R_1 = +64.07$ mm. | $t_1 = 7.0$ mm. |
| II | 1.5254 | 54.8 | .576 | $R_2 = -15.00$ | $t_2 = 2.0$ |
| III | 1.6129 | 44.0 | .583 | $R_3 = -30.57$ | $t_3 = 2.0$ |
| IV | 1.6110 | 58.8 | .567 | $R_4 = +24.45$ | $t_4 = 5.7$ |
|  |  |  |  | $R_5 = -130.00$ |  |

The focal length of each example is 100 mm. and the relative aperture is f/5.0. The lens elements are numbered by Roman numerals from front to rear. The second, third, and fourth columns give the refractive index N for the D line of the spectrum, the reciprocal dispersive index V and the partial dispersion ratio P as above defined. The last two columns give the radii and the thicknesses, each numbered by subscripts from front to rear. The + and − signs on the radii indicate surfaces respectively convex and concave toward the front. The two objectives shown have been designed for an overcorrection of spherochromatism. In Example 1 the index difference at the first surface is 0.0056 and the dispersive index of the first element is 88% of that of the second element. This combination results in an almost exact correction of the zonal spherical aberration. The f/5 ray being undercorrected by 0.01 mm. and the f/7 ray being overcorrected by only 0.02 mm. The second example has somewhat larger overcorrected zonal spherical aberration which is desirable in systems such as the present one to balance the ordinary zonal spherical aberration of the other objective in the system. In this case the difference in refractive indices at the first cemented surface is 0.0032 and the dispersive index of the first element is 94% of that of the second element. The third element is made of a glass which is designated as $K_zFS1$ in the Schott catalog and which has recently been substantially duplicated in this country. The fourth element is a dense barium crown glass in each case, differing in refractive index from the short flint glass by less than 0.01. This small difference in index is a convenience for the designer, but is not necessary for the best working of the lens because the third cemented surface is convex toward the front so that the light rays strike it at nearly normal incidence and thus it has a very small effect on the aberration. The secondary color is almost completely corrected so that the focus of the different colors from C to G' varies by less than 0.06 mm. in Example 1 and by less than 0.08 mm. in Example 2. The weighted averages of the P-values is less than 0.06 greater in the negative elements than in the positive elements.

In common with ordinary telescope doublets the radius of curvature of the front surface of the lens is determined by the requirement for coma correction and depends mostly upon the refractive index $n$ of the front lens element and of course upon the object distance at which the lens is to be corrected. For very distant objects the quantity $$\frac{(2n+1)nR_0}{(n-1)(n+2)F}$$

is preferably between the limits 2.0 and 2.25, while for a finite object distance S the radius of curvature differs from that of objectives corrected for distant objects according to the following formula:

$$\frac{1}{R_1}=\frac{1}{R_0}+\frac{2(n+1)}{(n+2)S}$$

where S is the object distance for which the lens is corrected and is negative for a real object in front of the objective, $R_0$ is the preferred radius of curvature for a lens corrected for distant objects as above defined, and $R_1$ is the preferred radius of curvature when the lens is corrected for an object distance S.

I have found that the best correction of zonal spherical aberration and spherochromatism is obtained when the radius of curvature $R_2$ of the first cemented surface is between .14 F and .18 F. The radius of curvature of the second cemented surface is determined in a manner well known in the design of ordinary telescope doublets. It depends upon the index difference at this surface, the object distance and the index of the element following the surface. I have found that this surface is preferably more strongly curved than in the corresponding telescope doublet having the same values of these three quantities. Preferably the difference in index at this surface is between 0.08 and 0.30 and the radius of curvature is between 0.25 F and 0.4 F. The third cemented surface is very easily determined during design by the requirement for chromatic correction and will vary greatly with the choice of crown glass that is used in the fourth element. Preferably this surface should have a radius of curvature between 0.2 F and 0.5 F. The rear surface of the objective is determined in known manner to produce the required focal length.

The 250 mm. objective is also apochromatic and has the following details of construction:

EF=250 mm.   f/12.5

| Lens | N | V | P | Radii | Thicknesses |
|---|---|---|---|---|---|
| V | 1.5254 | 54.8 | .576 | $R_6$=+160.13 mm | $t_5$=3.0 mm. |
| VI | 1.6129 | 44.0 | .583 | $R_7$=−94.45 | $t_6$=2.0 |
| VII | 1.6170 | 55.0 | .578 | $R_8$=+62.81 | $t_7$=3.0 |
|  |  |  |  | $R_9$=−388.0 |  |

The zonal abberration of this lens is not serious because of its low relative aperture, and the three element arrangement is very satisfactory.

To illustrate the degree of correction achieved in the four-element objective, the following table gives the results of very accurate computations of the back focal lengths or intersection lengths of paraxial, f/7 zonal, and f/5 marginal rays of the four colors indicated in the case of the first example above:

|  | Paraxial | F/7 | F/5 |
|---|---|---|---|
| C | 92.2696 mm. | 92.2767 mm. | 92.2589 mm. |
| D | 92.2458 | 92.2623 | 92.2259 |
| F | 92.2167 | 92.2346 | 92.2036 |
| G' | 92.2524 | 92.2766 | 92.2314 |

It will be noted that the shortest computed length is that of the F/5 ray for the F wavelength and the longest is the F/7 ray for the C wavelength. These two differ by 0.0731 mm. The paraxial back focal lengths of these two colors differ by only 0.0529 mm.

I claim:

1. An apochromatic telescope objective corrected for an object distance greater than 2 F from the front principal point of the objective where F is the focal length of the objective and consisting of four lens elements cemented together and forming three interfaces, each element being made of a glass having a refractive index between 1.48 and 1.80, wherein the following algebraic inequalities hold:

$$0.0025 < (N_1-N_2) < 0.01$$
$$0.08 < (N_3-N_2) < 0.30$$
$$-0.05 < (N_4-N_3) < +0.05$$
$$0.85\ V_2 < V_1 < 0.95\ V_2$$
$$41 < V_3 < V_1$$
$$(V_2+10) < V_4$$
$$P_3 < (0.672-0.00185 V_3) < P_4$$
$$2.0 < \frac{(2N_1+1)N_1 R_1}{(N_1-1)(N_1+2)F}+\frac{4(N_1+1)R_1}{(n+2)S} < 2.25$$
$$0.14\ F < -R_2 < 0.18\ F$$
$$0.25\ F < -R_3 < 0.4\ F$$
$$0.2\ F < +R_4 < 0.5\ F$$

where N, V, and P with subscripts denote the refractive index for the D line of the spectrum, the reciprocal dispersive index, and the partial dispersion ratio for the F to G' lines of the spectrum, respectively, of the lens elements denoted by the respective subscripts, the lens elements being numbered in order from front to rear, where $R_1$ to $R_4$ denote the radii of curvature of the front surface and the three interfaces numbered in order from front to rear, the + and − signs associated therewith indicating curvatures respectively convex and concave toward the front, and where S is the object distance for which the objective is corrected.

2. An objective according to claim 1 in which the weighted averages of the P-values of the glasses used in the negative elements is substantially equal to the weighted average of the P-values of the glasses used in the positive elements, said averages being weighted according to the dioptric powers of the respective elements.

3. An optical system for copying a small area of the sound track of a motion picture film onto another film sensitive to substantially an octave of wave lengths and at a fixed magnification between ¼ and 4, said system comprising a first objective according to claim 1 and a second objective having a focal length at least as long as that of the first objective, the ratio of the two focal lengths being equal to the magnification in the direction along the length of the film, the two objectives being arranged with collimated light between them.

4. An optical system according to claim 3 in which the second objective consists of a single component comprising at three elements cemented together, an interior element being negative and being made of a glass such that $$\frac{N_{G'}-N_F}{N_F-N_C}<(0.672-0.00185V)$$

where $N_{G'}$, $N_F$, $N_C$ and V are the refractive indices for the G', F, and C lines of the spectrum and the reciprocal dispersive index respectively of said glass.

5. An optical system according to claim 4 in which two cylindrical lens members, one positive and a stronger one negative, are aligned in the collimated light and optically separated by a distance equal to the difference of their focal lengths whereby the magnification in the direction across the motion picture film is altered by a factor between ⅓ and 3.

FRED E. ALTMAN.

REFERENCES CITED

The following references are of record in the file of this patent:

UNITED STATES PATENTS

| Number | Name | Date |
| --- | --- | --- |
| 576,896 | Rudolph | Feb. 9, 1897 |
| 671,066 | Graf | Apr. 2, 1901 |
| 777,320 | Urban | Dec. 13, 1904 |
| 1,938,808 | Ceccarini | Dec. 12, 1933 |
| 2,252,682 | Aklin | Aug. 19, 1941 |
| 2,405,729 | Altman | Aug. 13, 1946 |

Certificate of Correction

Patent No. 2,500,017 — March 7, 1950

FRED E. ALTMAN

It is hereby certified that errors appear in the printed specification of the above numbered patent requiring correction as follows:

Column 2, line 26, for the word "element" read *elements*; line 42, for "telescopic" read *telescope*; column 6, line 66, after "comprising at" insert *least*;

and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*